Patented Nov. 22, 1938

2,137,794

UNITED STATES PATENT OFFICE 2,137,794

COMPOSITION OF MATTER AND METHOD OF MAKING SAME

Michael Baffa, Indianapolis, Ind., assignor to Lilly Varnish Company, Indianapolis, Ind., a corporation No Drawing. Application February 4, 1935, Serial No. 4,887

3 Claims. (Cl. 134—48)

This invention relates to a new combination of matter and the method of making the same resulting in a pigment stain of a light-fast and uniform character.

The purpose of the invention is to provide a stain of this character for wood finishing which will show no black streaks as distinguished from the streaks resulting in the use of the usual oil pigment stains embodying black aniline or oil colors.

One of the principal advantages of this composition is that it shows as a water stain, while, at the same time, it will fill the pores of the wood surface to which it is applied and covers the sap spots. In this connection it may be noted that in the use of the usual water stain it is generally required for proper finishing to sand the surface of the wood to which it is applied after the application of the stain. In the use of this composition, the sanding requirement is eliminated since the pigment stain does not raise the grain.

Another advantage of the invention resides in its more durable quality in respect to fading. It develops a more light-fast characteristic than corresponding compositions, being faster and more lasting than oil stains.

The composition primarily comprises a mixture of pigment ground in oil, naphtha, water, an emulsifier and a water stain powder in the following suggested relation for a batch of five gallons:

10 pounds of pigment ground in oil,
19 pounds or 3 gallons of naphtha,
2 pounds or 1 quart of water,
2 pounds or 1 quart of emulsifier,
½ pound of water stain powder.

In producing the composition, the preferable method is as follows:

1. Dissolve ½ pound of water stain powder in 1 quart of water, after which this solution is thoroughly mixed with 1 quart of the emulsifier.

2. Thoroughly mix 10 pounds of color pigment ground in oil with 3 gallons of naphtha.

3. Thoroughly mix the solutions resulting from the first and second steps in the process, which will result in the desired pigment stain composition.

The above-described formula and process is one example which may be followed, the amount of water, however, employed in the first solution being varied, depending upon the requirement of the desired shades or colors, also depending upon the color and shade employed. Variations in the above proportions should be carried out in relation to the quantity of the emulsifier employed.

While the above formula is set forth with definite quantities of the several ingredients, it will readily lend itself to variations to obtain any desired result, particularly in respect to using different colors and shades of pigments.

It may be suggested that the emulsifier employed in the first mixture above set forth may be as follows:

| | Ounces |
|---|---|
| Sulphonated vegetable or animal oil | 20½ |
| Paraffin oil | 5½ |
| Water | 1¼ |
| Soap | 4¾ |

Making a total of approximately 32 ounces for the quart of emulsifier set forth in the above formula. It should be recognized, however, that the above proportions are given roughly and need not be too closely followed.

The above method is pursued under ordinary temperature conditions, such as the usual room temperature.

The invention claimed is:

1. A new composition of matter having the characteristics of a light-fast pigment stain, comprising a mixture in the proportions of approximately ten pounds of pigment ground in oil, approximately three gallons of naphtha, approximately one quart of water, approximately twenty and one-half ounces of a sulphonated oil of a class consisting of vegetable and animal oils; approximately five and one-half ounces of paraffin oil, approximately four and three-fourths ounces of soap, and approximately one-half pound of water stain powder.

2. The method of producing a new composition of matter having the characteristics of a light-fast pigment stain, consisting in proportionately mixing approximately twenty and one-half ounces of a sulphonated oil of a class consisting of vegetable and animal oils with approximately five and one-half ounces of paraffin oil, approximately one and one-half ounces of water and four and three-fourths ounces of soap to make approximately one quart of emulsifier, dissolving one-half pound of water stain powder with one quart of water and thereafter mixing the same with said emulsifier, thoroughly mixing approximately ten pounds of pigment ground in oil with approximately three gallons of naphtha and thereafter mixing the latter composition with the water stain powder and emulsifier mixture, proportionately varying the said quantities in accordance with the amount of the product to be produced and varying the amounts of water and emulsifier in accordance with the desired shades or colors of the composition.

3. A new composition of matter having the characteristics of a light fast pigment stain comprising a water solution of a water stain powder, and a color pigment ground in oil and diluted with naphtha, mixed with an emulsifier consisting of paraffin oil, soap and a sulphonated oil of a class consisting of vegetable and animal oils, the proportions by volume of the water solution and diluted color pigment being of the order of one to twelve.

MICHAEL BAFFA.